United States Patent
Berry

(10) Patent No.: US 10,544,565 B2
(45) Date of Patent: Jan. 28, 2020

(54) ON DEMAND MACHINE RIMPULL ADJUSTMENT TO PREVENT TIRE SLIP

(71) Applicant: Caterpillar Inc., Peoria, IL (US)

(72) Inventor: Jeffery Berry, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 170 days.

(21) Appl. No.: 15/785,949

(22) Filed: Oct. 17, 2017

(65) Prior Publication Data

US 2019/0112790 A1 Apr. 18, 2019

(51) Int. Cl.
| | |
|---|---|
| *E02F 3/34* | (2006.01) |
| *E02F 9/22* | (2006.01) |
| *B60K 17/02* | (2006.01) |
| *B60K 17/356* | (2006.01) |
| *E02F 9/20* | (2006.01) |

(52) U.S. Cl.
CPC ............ *E02F 9/2253* (2013.01); *B60K 17/02* (2013.01); *B60K 17/356* (2013.01); *E02F 9/2246* (2013.01); *B60Y 2200/41* (2013.01); *E02F 9/202* (2013.01); *E02F 9/2079* (2013.01)

(58) Field of Classification Search
CPC ...... A01B 67/00; E02F 9/2246; E02F 9/2253; E02F 9/2079; E02F 3/34; B60K 6/08; B60K 23/00; B60K 28/165; B60K 28/16; B60K 17/02; B60K 17/356; B60W 30/18172; B60W 30/1886; B60W 10/06; B60W 10/30; F16H 61/472; F16H 61/475
USPC ............ 37/347, 348, 414; 172/1–11; 701/50
See application file for complete search history.

(56) References Cited

U.S. PATENT DOCUMENTS

| | | | |
|---|---|---|---|
| 6,234,254 B1 | 5/2001 | Dietz | |
| 7,853,384 B2 | 12/2010 | Johnson | |
| 8,726,543 B2* | 5/2014 | Kelly | ................... E02F 9/2029 172/2 |
| 9,139,981 B2 | 9/2015 | Mitchell | |
| 9,555,706 B1* | 1/2017 | Mitchell | ............... B60K 28/165 |
| 9,556,590 B2* | 1/2017 | Moriki | .................. E02F 9/2066 |
| 9,689,492 B2* | 6/2017 | LaVoie | .................... F16H 61/56 |
| 9,845,008 B2* | 12/2017 | Brownell | ............... B60K 28/16 |
| 2006/0191732 A1 | 8/2006 | Lunzman et al. | |
| 2012/0293316 A1 | 11/2012 | Johnson et al. | |
| 2013/0259620 A1 | 10/2013 | Shirao | |
| 2014/0069092 A1* | 3/2014 | Elliott | ................... F16H 61/431 60/445 |
| 2015/0361636 A1 | 12/2015 | Yoshizawa et al. | |

FOREIGN PATENT DOCUMENTS

JP 2008144942 6/2008

* cited by examiner

*Primary Examiner* — Robert E Pezzuto
(74) *Attorney, Agent, or Firm* — Hibshman Claim Construction PLLC

(57) ABSTRACT

A system for proactively controlling a rimpull limit of a machine includes a hydraulic system having a lift cylinder to move an implement; a lift cylinder pressure sensor that senses a hydraulic pressure of the lift cylinder and responsively produces a lift cylinder pressure signal; and a controller in operable communication with the power train and the lift cylinder pressure sensor. The controller is configured to receive the lift cylinder pressure signal; determine the rimpull limit based at least in part upon the lift cylinder pressure signal; and adjust the torque of the power train to the rimpull limit.

19 Claims, 3 Drawing Sheets

US 10,544,565 B2

ON DEMAND MACHINE RIMPULL ADJUSTMENT TO PREVENT TIRE SLIP

TECHNICAL FIELD

The present disclosure generally relates to machine systems for use on a machine to limit the rimpull of the machine on demand.

BACKGROUND

Generally in a machine, such as a wheel loader and the like, utilizing an implement based hydraulic system, it is desired to have the engine operating at a high engine speed to ensure proper operation of the hydraulic implement. Often this high engine speed, while desirable for operation of the hydraulic implement, provides too much torque to the drive train of the machine, wherein this torque can cause wheel slippage and increased tire wear.

When using the machine to push or move a pile of material with an implement, to prevent tire slip, the machine operator must lift or push into the pile to generate downforce on the tires. An inexperienced operator may lift too early, causing the implement to ride up and over the material, or lift too late, causing the tires to slip and wear prematurely.

One method to prevent wheel slip and tire wear is by controlling the rimpull of the machine though an adjustment of available torque to the drive train. Rimpull is generally defined as the force available at the wheels to move a wheeled machine forward. Traditional methods of controlling the rimpull are generally selected by or utilized by an operator of the machine prior to using the implement for lifting and moving. This type of system based upon operator selection prior to doing work has inherent drawbacks. A machine system is desired for adjusting machine rimpull proactively and on demand based upon machine operating parameters.

SUMMARY OF THE INVENTION

In accordance with one aspect of the disclosure, a machine system for proactively controlling and limiting rimpull on a machine is disclosed. The machine includes an implement and a power train with an engine producing torque. The implement is in operable communication with a hydraulic system including a lift cylinder to move the implement. The lift cylinder having a pressure with a sensor adapted to sense the pressure of the lift cylinder and responsively produce a lift cylinder pressure signal. A controller is in operable communication with the power train and lift cylinder pressure signal and configured to determine a rimpull limit based upon the pressure within the lift cylinder and correspondingly and proactively modify the torque to this rimpull limit. Accordingly, the rimpull limit will be varied according to the pressure placed on the lift cylinder by the implement.

In another embodiment of the first aspect of the disclosure, the machine system includes a lift position sensor and tilt position sensor producing a lift position signal and a tilt position signal communicating the lift position and the tilt position of the implement, wherein these positions are used by the controller to further limit the rimpull.

In another embodiment of the first aspect of the disclosure, the controller receives an input from a user or supervisory controller related to a coefficient of friction for a given surface the machine is operated upon. Accordingly, a user or supervisory controller can utilize the input to further refine the rimpull limit for a given surface.

In another embodiment of the disclosure for a machine system that is adapted to control tire slip in a machine. The machine includes an implement, a power train including an engine, a wheel having a tire in operable communication with the power train, and a rimpull. The implement is in communication with a hydraulic system including a lift cylinder having a pressure and operably connected to the implement to generally move the implement. A lift cylinder pressure sensor sensing the pressure of the lift cylinder and responsively producing a lift cylinder pressure signal. A controller is in operable communication with the lift cylinder pressure signal and configured to determine a downforce on the wheel based upon the lift cylinder pressure signal and proactively modify the rimpull in proportion to the pressure.

In another embodiment of the present disclosure, the machine system includes a lift position sensor and a tilt position sensor. The lift position sensor and the tilt position sensor responsively producing a lift position signal and a tilt position signal related to the position of the implement. The control in operable communication with the lift position signal and the tilt position signal and configured to determine the downforce on the wheel based upon the lift cylinder pressure signal, lift position signal, and tilt position signal and proactively modify the rimpull in proportion to the signals.

In another embodiment of the present disclosure, a method for determining an on demand rimpull limit for a machine is disclosed. The method discloses the steps of sensing the hydraulic pressure of a lift cylinder in operable communication with an implement and determining the rimpull limit based upon the pressure signal. The rimpull limit is then used to reduce a torque transmitted through the power train accordingly.

DETAILED DESCRIPTION

Figure 1:
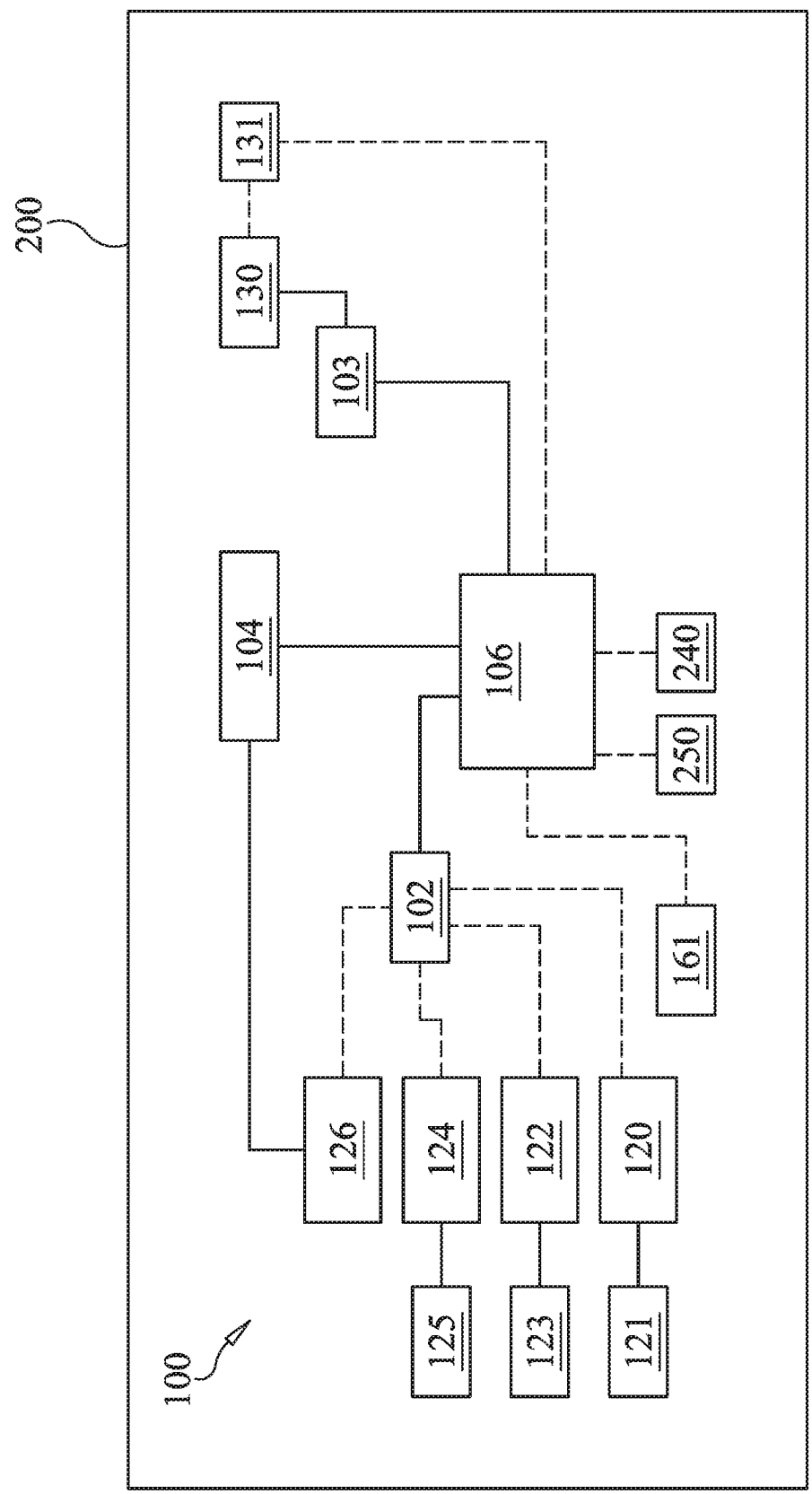
FIG. 1 is a general schematic view of an exemplary embodiment of a system constructed in accordance with the teachings of this disclosure.
Figure 2:
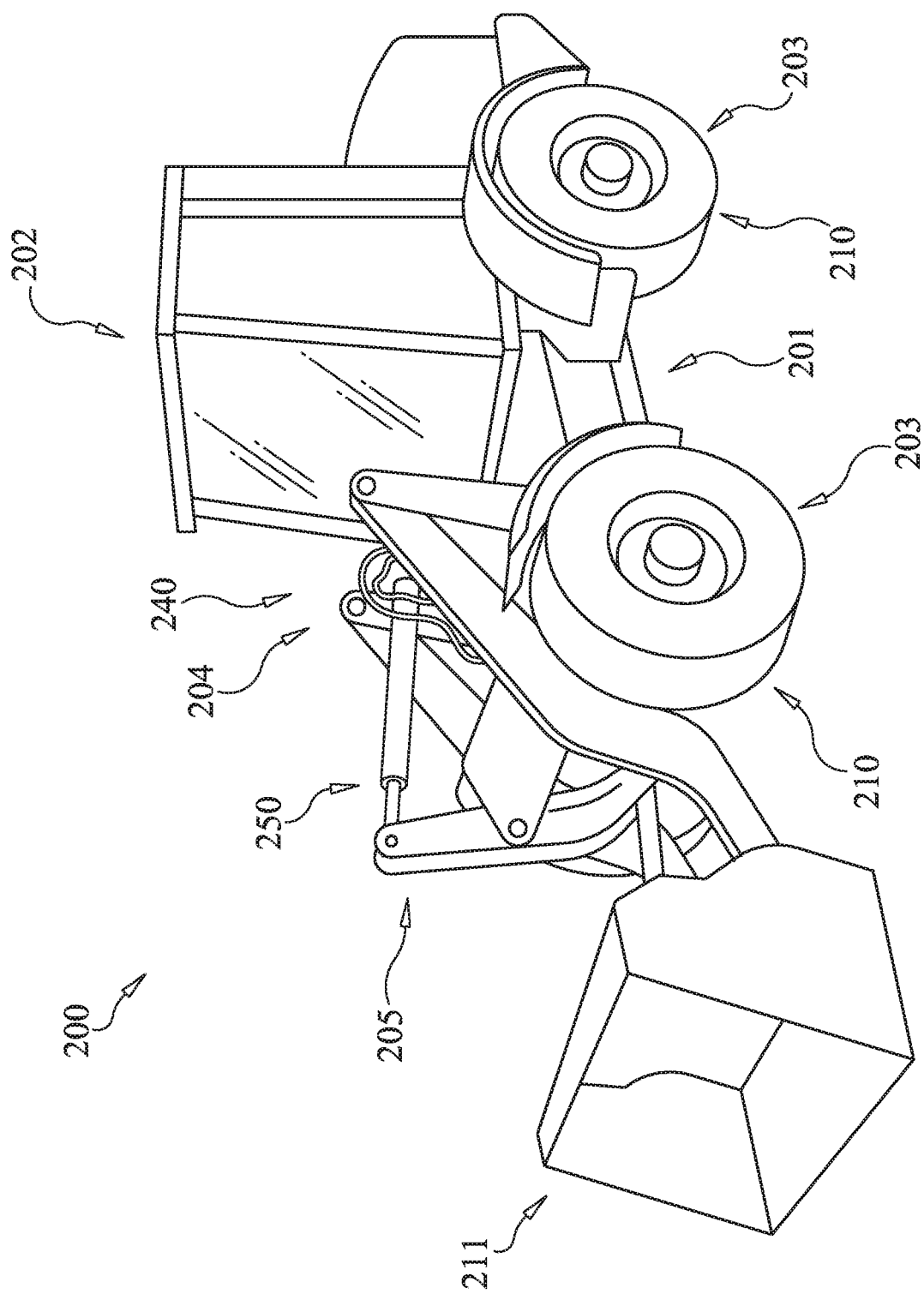
FIG. 2 is a perspective view of an embodiment of an exemplary vehicle in which a system in which the teachings of the disclosure may be used.

Referring now to the drawings, and with reference to FIG. 1 and FIG. 2, there is shown a machine system of the present disclosure and generally referred to by reference numeral 100. The machine system 100 may comprise one or more wheels 210, a power train 102, a hydraulic system 103, an engine, 104, an implement 211, and a controller 106.

In FIG. 2, an exemplary machine 200, a wheel loader, which incorporates the features of the present invention is shown. The machine 200 includes a frame 201 generally supporting the various assemblies and mechanical systems of the machine 200. The frame 201 supporting a cab assembly 202, axel assemblies 203, a lift assembly 204, and a tilt assembly 205.

The lift assembly 204 and tilt assembly 205 are pivotally mounted on the machine 200 and in operable communication with the implement 211, wherein the movement of the lift assembly 204 and tilt assembly 205 is translated to the implement 211 in the form a change in a height or an angular tilt of the implement 211. Within this exemplary machine 200, the implement 211 is depicted as a bucket, although other implement 211 types may be utilized.

The axel assemblies 203 are in operable communication with the wheels 210 and in operable communication with the engine 104, wherein rotation of the axel assemblies 203 and wheels 210 is generally powered by the engine 104 through engagement with the power train 102.

The cab assembly 202 may include a plurality of control devices in the form of joysticks, pedals, user interfaces, controls and other types of display and input devices to provide input to the controller 106.

While the description and drawings are made with reference to the machine system 100 positioned on a wheel loader, the teachings of the disclosure may be implemented on other machines utilized in earth moving, mining, construction, farming, material handling, transportation, and other similar machines. Accordingly, as a wheel loader is shown, the machine may be a bulldozer or other type of machine.

Referring now back to FIG. 1, the machine system 100 of the present disclosure, the hydraulic system 103 includes a lift cylinder 130 in operable communication with the lift assembly 204 (FIG. 2), wherein the lift cylinder 130 is generally adapted to actuate the lift assembly 204 to change a height of the implement 211 and in the form of a linkage. The lift cylinder 130 may be a rod and cylinder assembly as is known in the art, wherein the lift cylinder 130 generally receives a pressurized fluid from the hydraulic system 103 to actuate the lift assembly 204.

A lift cylinder pressure sensor 131 is deposed on the machine 200 to sense the pressure within the lift cylinder 130 and generate a responsive signal for input into the controller 106. The signal from the lift cylinder 130 generally utilized to calculate a downforce on the wheels 210, wherein the lift cylinder 130 sensed pressure is one of the primary variables used within this calculation. The lift cylinder pressure sensor 131 may be comprised of one or more sensors and be provided from any sensor type known with the art and suitable for the purpose of sensing a pressure.

Accordingly, the lift cylinder 130 pressure is used to determine the force on the wheel 210 during machine 200 work and wherein the machine system 100 controller 106 generally adjusts the machine 200 rimpull by determining a rimpull limit and proactively controlling corresponding power train 102 and engine 104 systems proportionately to the rimpull limit.

Further, one or more sensors may be disposed on the machine 200 and configured as a lift position sensor 240 in operable communication with the controller 106 to send a responsive signal representative of the position of the lift assembly 204. Similarly, one or more sensors may be disposed on the machine 200 and configured as a tilt position sensor 250 in operable communication with the controller 106 to send a responsive signal responsive to the position of the tilt assembly 205.

The controller 106 generally adapted in a most basic form to utilize the lift sensor pressure 130 to determine a limit on the rimpull in proportion to the lift cylinder 130 pressure. Accordingly, this rimpull limit is controlled by adjusting a torque from the engine 104 through the power train 102 and to the wheels 210.

In an advanced implementation, the system 100 of the present disclosure is generally adapted to utilize multiple sensor signals 131, 240, 250 to determine the downforce on the wheels 210 and limit the rimpull accordingly.

The following variables are generally utilized in the system 100 with the below calculations to determine the downforce:

$F_x$: horizontal component of force applied to the implement tip
$F_y$: vertical component of force applied to the implement tip
$F_{cyl}$: lift cylinder force
$F_0$: lift cylinder force induced by an empty implement lift assembly and tilt assembly linkage weight
$\Delta F_{cyl}$: lift cylinder force induced by external force
$k_x$: lift cylinder force increase due to unit $F_x$ horizontal force
$k_y$: lift cylinder force increase due to unit $F_y$ vertical force
W: machine weight
μ: coefficient of friction The force in the lift cylinder is a composite of force induced by an empty linkage weight and external forces.

$$F_{cyl} = F_0 + \Delta F_{cyl}$$

Assuming a fixed point of application (implement tip), the cylinder force is the sum of the external force vector components and their respective kinematic gain factors.

$$\Delta F_{cyl} = F_x k_x + F_y k_y$$

$$F_y = \frac{\Delta F_{cyl} - F_x k_x}{k_y}$$

The gain factors and empty bucket cylinder force are each a function of lift and tilt position which can be expressed as lookup maps.

$$k_x = f_1(\text{lift}, \text{tilt})$$

$$k_y = f_2(\text{lift}, \text{tilt})$$

$$F_0 = f_3(\text{lift}, \text{tilt})$$

To avoid slipping the horizontal force must be less than the product of the coefficient of friction and the total vertical load on the tires.

$$F_x < \mu(W + F_y)$$

Substituting for $F_y$ and solving for $F_x$ $$f_x < \mu\left(W + \frac{\Delta F_{cyl} - F_x k_x}{k_y}\right)$$

$$F_x < \mu \frac{W k_y + \Delta F_{cyl}}{k_y + k_x \mu}$$

Finally substituting for $\Delta F_{cyl}$ we have the horizontal force limit expressed in terms of current cylinder force, linkage position, and assumed coefficient of friction $$F_{xlimit} = \mu \frac{W k_y + F_{cyl} - F_0}{k_y + \mu k_x}$$

Based upon this above calculation, $F_{xlimit}$ is the rimpull limit for a given machine 200 based upon the system 100. Accordingly, the machine 200 can approach a pile with the implement 211 and wherein the controller 106 will adjust the rimpull based upon the lift cylinder 130 pressure and adjust the rimpull limit as the pressure increases. Accordingly, the rimpull limit is generally adjusted between a range of 60% and 100% of the total available rimpull based upon the pressure of the lift cylinder 130, although the limit can be reduced below 50%. As the pressure sensed 131 on the lift cylinder 130 increases, the rimpull limit is proportionately increased towards 100% of the total available rimpull to ensure efficient usage of the machine 200 hydraulic system 103.

The controller 106 may receive an input 161 for the coefficient of the friction ("μ") within the above calculation. Accordingly, the machine 200 operator may make an adjustment to the rimpull limit based upon a given ground surface, wherein the input 161 is adjusted to the actual friction of a given surface the machine 200 is operated upon.

Depending on the power train 102 system of a given machine 200 the rimpull limit will be adjusted utilizing a different mechanism. For a machine 200 having a power train 102 type with an impeller clutch torque converter 120 the controller 106 will control the rimpull limit through a clutch pressure of the impeller clutch 121. For a machine 200 having a power train 102 type with an electric motor with a continuously variable transmission ("CVT") 122 the controller 106 will control the rimpull limit through electric motor current 123. For a machine 200 having a power train 102 powered through hydraulics and having a hydrostatic CVT 124 the controller 106 will control the rimpull limit through variator displacement 125. For a machine 200 having a power train 102 type with a torque converter 126 the controller 106 will control the rimpull limit though engine 104 speed.

In use, a user of the machine system 100 on the machine will generally implement the system 100 to prevent tire wear where the controller 106 will set the rimpull limit on demand based upon the lift cylinder pressure 130 sensed pressure 131. As the user approaches a pile of material to be moved the rimpull limit is reduced in proportion to the lift cylinder 130 pressure. As there is no material in the implement 211, the pressure within the lift cylinder 130 is relatively low and the torque provided to the wheels 210 is limited. As the user pushes into the pile with the machine 200 implement 211, the lift cylinder 130 pressure increases and the controller 106 correspondingly and proportionately increases the rimpull limit. As material is added to the implement 211 downforce increases on the wheels 210 and the rimpull no longer needs to be limited.

INDUSTRIAL APPLICABILITY

Figure 3:
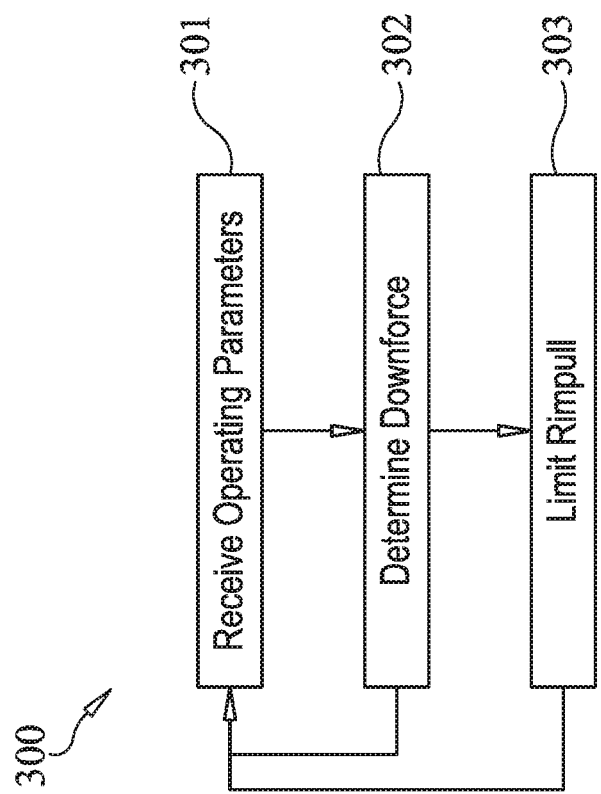
FIG. 3 is a flowchart illustrating exemplary blocks of an exemplary method for preventing tire slip in a machine, in accordance with the teachings of this disclosure.

Referring now to FIG. 3, an exemplary flowchart is illustrated showing sample method steps that may be followed in setting an on demand rimpull limit for a machine 200 to prevent tire slip during machine 200 use. The method 300 may be practiced with more or less method steps and is not limited to the order shown. While in the flowchart, the controller 106 processes operational parameters to determine if the machine 200 and implement 211 are doing work, wherein the rimpull of the wheels 210 is limited to prevent tire slip.

The initial method step 301 includes, receiving by a controller 106, operational parameters. The operational parameters may include sensed data related to weight and positioning of the implement 211 and input 161 related to the friction of the surface the machine 200 is operated upon.

In one embodiment of the present disclosure, the controller 106 receives a pressure signal 131 from the lift cylinder 130. In an alternate embodiment, the controller 106 receives a pressure signal 131 from the lift cylinder 130 and a signal from the position sensor 240 of the lift assembly 204. In an alternate embodiment, the controller 106 receives a pressure signal 131 from the lift cylinder 130, a signal from the position sensor 240 of the lift assembly 204, and a signal from the position sensor 250 of the tilt assembly.

After the controller 106 receives the given operational parameters at step 301, the controller 106 identifies, through a calculation, the downforce needed at the wheels 210 of the machine 200 to prevent wheel 101 slip at step 302.

Based upon this downforce, the controller 10 then limits the rimpull of the machine 200 at step 303. Throughout the use of the machine 200, step 302 is repeated and wherein step 303 is continually processed on demand to prevent wheel 101 slip during machine 200 use.

What is claimed is:

1. A system for proactively controlling a rimpull limit of a machine, the machine including an implement and a power train including an engine and producing a torque, the system comprising:
   a hydraulic system, the hydraulic system including a lift cylinder to move the implement;
   a lift cylinder pressure sensor that senses a hydraulic pressure of the lift cylinder and responsively produces a lift cylinder pressure signal; and
   a controller in operable communication with the power train and the lift cylinder pressure sensor, the controller being configured to:
   receive the lift cylinder pressure signal;
   determine the rimpull limit based at least in part upon the lift cylinder pressure signal;
   increase the rimpull limit in response to an increase in the hydraulic pressure of the lift cylinder; and
   adjust the torque of the power train to the rimpull limit.

2. The system of claim 1, wherein the power train includes a torque converter having an impeller clutch, the controller being further configured to adjust a pressure of the impeller clutch based on the rimpull limit.

3. The system of claim 1, wherein the power train includes an electric motor in communication with a continuously variable transmission, the controller being further configured to adjust a current to the electric motor based on the rimpull limit.

4. The system of claim 1, wherein the power train includes a hydrostatic motor in communication with a continuously variable transmission, the controller being further configured to adjust a displacement of a variator based on the rimpull limit.

5. The system of claim 1, wherein the power train includes a torque converter, the controller being further configured to adjust a speed of the engine based on the rimpull limit.

6. The system of claim 1, further comprising:
   a lift position sensor that senses a lift position of the implement and responsively produces a lift position signal; and
   a tilt position sensor that senses a tilt position of the implement and responsively produces a tilt position signal,
   the controller being in operable communication with the lift position sensor and the tilt position sensor, the controller being further configured to determine the rimpull limit based upon the lift cylinder pressure signal, the lift position signal, and the tilt position signal.

7. The system of claim 6, wherein the controller is further configured to receive a friction input that is related to a coefficient of friction for a given surface upon which the machine is operate, and determine the rimpull limit based at least in part upon the friction input.

8. A system for proactively controlling tire slip of a machine, the machine including an implement and a power train including an engine and producing a rimpull, the system comprising:

a wheel having a tire and mounted on the machine in operable communication with the power train;

a hydraulic system including a lift cylinder to move the implement;

a lift cylinder pressure sensor that senses a pressure of the lift cylinder and responsively produces a lift cylinder pressure signal; and a controller in operable communication with the power train and lift cylinder pressure sensor, the controller being configured to:

receive the lift cylinder pressure signal;

determine a downforce on the wheel based at least in part upon the lift cylinder pressure signal; and increase the rimpull applied to the wheel in response to an increase in the downforce on the wheel.

9. The system of claim 8, wherein the power train includes a torque converter having an impeller clutch, the controller being further configured to adjust a pressure of the impeller clutch to modify the rimpull.

10. The system of claim 8, wherein the power train includes an electric motor in communication with a continuously variable transmission, the controller being further configured to adjust a current to the electric motor to modify the rimpull.

11. The system of claim 8, wherein the power train includes a hydrostatic motor in communication with a continuously variable transmission, the controller being further configured to adjust a displacement of a variator to modify the rimpull.

12. The system of claim 8, wherein the power train includes a torque converter, the controller being further configured to adjust a speed of the engine to modify the rimpull.

13. The system of claim 8, further comprising a lift position sensor, the lift position sensor sensing a lift position of the implement and responsively producing a lift position signal, the controller being in operable communication with the lift position signal, the controller being further configured to determine the downforce on the wheel based at least in part upon the lift cylinder pressure signal and the lift position signal.

14. The system of claim 13, further comprising a tilt position sensor, the tilt position sensor sensing a tilt position of the implement and responsively producing a tilt position signal, the controller being in operable communication with the tilt position signal, the controller being further configured to determine the downforce on the wheel based at least in part upon the lift cylinder pressure signal, the lift position signal, and the tilt position signal.

15. The system of claim 13, wherein the controller is further configured to receive a friction input that is related to a coefficient of friction for a given surface upon which the machine is operated, and adjust the rimpull applied to the wheel based at least in part upon the friction input.

16. A method for on demand rimpull control of a machine, the machine including an implement in operable communication with a hydraulic lift cylinder and a power train including an engine and producing a torque, the method comprising:

sensing a hydraulic pressure of the hydraulic lift cylinder;

receiving within a controller a hydraulic pressure signal that is indicative of the hydraulic pressure of the hydraulic lift cylinder;

determining, via the controller, a rimpull limit based at least in part upon the hydraulic pressure signal;

increasing the rimpull limit in response to an increase in the hydraulic pressure of the hydraulic lift cylinder; and adjusting the torque to the rimpull limit.

17. The method of claim 16, further comprising:

sensing a lift position of the implement; and determining, via the controller, the rimpull limit based at least in part upon the lift position of the implement.

18. The method of claim 16, further comprising:

sensing a tilt position of the implement; and determining, via the controller, the rimpull limit based at least in part upon the tilt position of the implement.

19. The method of claim 17, further comprising:

receiving within the controller a friction input that is related to a coefficient of friction for a surface upon which the machine is operated; and determining, via the controller, the rimpull limit based at least in part upon the friction input.

* * * * *